Feb. 25, 1969  K. M. POVENMIRE ET AL  3,430,125
ISOLATING CIRCUIT FOR MAKING ELECTRICAL MEASUREMENTS
Filed Nov. 4, 1966

INVENTORS
Kenneth M. Povenmire
Marshall D. Clanin
Wood, Herron & Evans
ATTORNEYS

United States Patent Office 3,430,125
Patented Feb. 25, 1969

3,430,125
ISOLATING CIRCUIT FOR MAKING ELECTRICAL MEASUREMENTS
Kenneth M. Povenmire and Marshall D. Clanin, Columbus, Ohio, assignors to Halmar Electronics, Incorporated, Columbus, Ohio, a corporation of Ohio
Filed Nov. 4, 1966, Ser. No. 592,153
U.S. Cl. 321—2                  2 Claims
Int. Cl. H02m 3/32

ABSTRACT OF THE DISCLOSURE

A circuit located between electro-chemical cells and electrical measuring apparatus for providing conductive isolation between the electrical measuring apparatus and the electro-chemical cells while permitting the transmission of electrical signals between the cells and the electrical measuring apparatus through isolating transformers.

---

Figure 1:
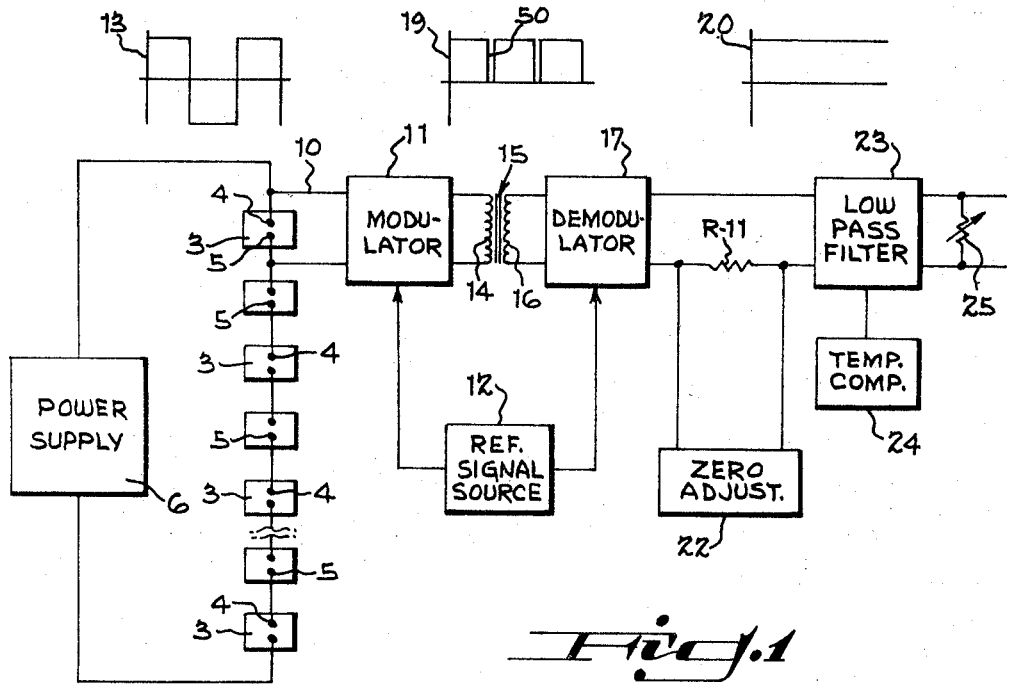

This invention relates to apparatus for electrically transmitting a voltage from a direct current input to an output while conductively isolating the input from the output to prevent injury to the personnel and equipment. The invention is particularly adapted for use in measuring the potential across electrodes used in the electromechanical process of extracting aluminum from bauxite ore.

In a typical installation for the extraction of aluminum, a line of cells, that is, containers in which the extraction process is carried out is supplied with very high currents from a single source as, for example, 800 volts. Each cell has two electrodes, one of them being a carbon anode, and the electrodes of adjacent cells in the line are connected in series with each other. Because of the circuit conditions, any one of the cells may be at 800 volts above earth ground. Leakage currents from the cell line connect the line to ground. This ground may shift from cell to cell during the day and cannot be easily determined. Therefore, every cell must be considered at 800 volts for safety reasons. Each cell has an applied voltage of between 4 and 5 volts and one hundred sixty eight cells are in the line.

Because of the series connection of the cells, the voltage across any cell is dependent upon the resistance between its electrodes and this is in turn dependent upon the conditions of the process. Of these conditions, two are of particular importance. The first is the quantity or percentage of alumina, that is, aluminum oxide, in the cell and the second is the condition of the carbon anode, for the carbon anode burns away during the process.

The percentage of alumina in the cell, which should be maintained at between two and five percent, is of critical importance for if there is too much or too little alumina, the resistance of the cell increases, and sometimes quite sharply. A rapid increase in the resistance of the cell can cause the voltage across the cell to rise rapidly with not only a detrimental effect to the production of aluminum in the particular cell but also with a detrimental effect to the surrounding cells and equipment.

The voltage will also rise when the anodes burn away, thereby requiring additional anode stock to be inserted into the cell.

It is desirable to computerize the operation of each cell in the line so that additional alumina can be added to the process as well as additional anode stock when required. Computerization of the process requires the continuous monitoring of the voltage between the electrodes of the cell.

In the continuous monitoring of the voltage between electrodes, it is of utmost importance that the output of the monitoring or voltage transmitting apparatus be electrically or conductively isolated from the cell electrodes. It should be understood that the cell electrodes constitute a source of tremendous power, for at the high potential end of the cells, the electrodes are at 800 volts and are capable of delivering several hundred thousand amperes. This power potential is obviously sufficient to cause considerable harm to personnel and equipment.

The presently used approaches to this problem rely on converting the reduction cell voltage to a current by using a high value series resistance and then sensing the resulting current in a magnetic core. Both flux gate and Hall effect devices must use this approach and their success depends on the complexity of the circuitry associated with the magnetic core and the negative feedback applied to it. The increased complexity increases the basic cost of the device.

It has been an objective of the invention to provide apparatus for transmitting and utilizing the voltage of the cell electrodes, the apparatus providing for complete conductive isolation of the output of the apparatus from the input.

This objective of the invention is achieved by providing apparatus in which the direct current output voltage from the cell is modulated and fed into the input of a transformer, the output of the transformer being demodulated to provide a direct current output voltage. The output voltage may be filtered, temperature compensated, and provision may be made to adjust its zero point and to provide any desired ratio of it to the voltage of the cell. The transformer provides the desired conductive isolation and permits the output side of the isolator to be grounded and permits the monitoring equipment to be grounded.

Another objective of the invention has been to provide means, in the apparatus described, for exciting the modulator and demodulator on each side of the isolating transformer so as to provide assurance of exact synchronization. The reference or excitation signal obviously cannot conductively interconnect the primary and secondary of the isolating transformer for this would destroy the isolation. This objective of the invention is therefore attained by providing excitation from a single source to the modulator on one side of the transformer and the demodulator on the other side of the isolating transformer while maintaining conductive isolation between the modulator and demodulator.

The invention contemplates powering the exciter either from a separate source such as a 110 volt alternating current source or alternatively providing for excitation from the cell voltage itself through the use of a multivibrator circuit by which the cell voltage is converted from direct current to alternating current.

Still further, the invention contemplates imposing the excitation voltage across a Zener diode network on both the modulator and demodulator so that the operation of the apparatus is independent of the r.m.s. value of the excitation voltage.

Figure 2:
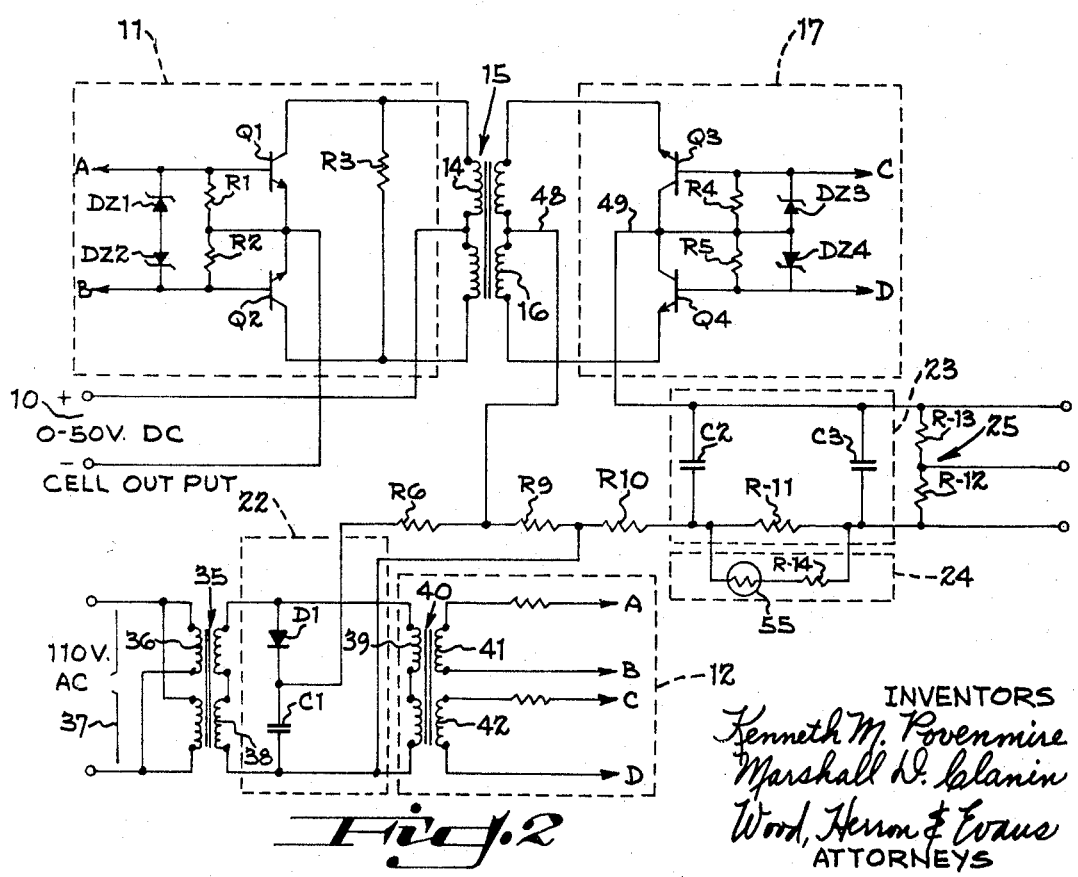

These and other objectives of the invention will become more readily apparent from the following description of the invention taken in conjunction with the drawing in which:

FIG. 1 is a block diagram of the electrical circuit in a line of aluminum reduction cells and FIG. 2 is a circuit diagram of the voltage isolator circuit.

The general organization of the apparatus is illustrated in FIG. 1 in conjunction with a line of aluminum reduction cells. The line includes a series of cells 3, each of which has a carbon anode 4 and a cathode 5. The cells in the line, for example, 168 of them, are connected in series with each other, the line of cells being connected across a power supply 6 which applies 800 volts direct current to the line and is capable of delivering 100,000 amperes to the line.

The voltage isolating and transmitting apparatus of the invention is connected to the electrodes of each cell. The output of each cell which, under normal operating conditions, is between 4 and 5 volts, is indicated at 10 and constitutes the input to the voltage isolating and transmitting apparatus.

The input, that is to say, the voltage to be measured, indicated at 10 is fed into a modulator circuit 11 which is excited by a reference signal produced by the circuit 12. The input voltage at 10 to the modulator 11 is a direct current voltage and at the output it is an alternating current voltage as indicated by the wave form 13.

The alternating output voltage is fed to the primary 14 of a transformer 15. The output of the transformer at the secondary 16 is fed to a demodulator 17 which is also controlled by the reference signal circuit 12. The output of the demodulator (wave form 19) is fed through a lowpass filter 23 which attenuates everything above 25 cycles per second providing the wave form indicated at 20. The wave form prior at the input to the lowpass filter is indicated at 19. In the lowpass filter 23, provision is made for temperature compensation as indicated at 24.

The output of the demodulator 17 is regulated by a zero adjustment resistor R9 which has a voltage applied across it from a zero adjustment circuit 22 which permits the raising or lowering of the zero point of the output voltage.

There is at the output of the system an adjustable resistance 25 which is a calibration control resistance through which the ratio of input to output can be varied within limits.

In general, the operation is as follows. The direct current voltage from the cell electrodes at 10 is modulated to provide an alternating current proportional to the direct current. The alternating current is fed to the transformer 15 which provides the desired conductive isolation. The output of the transformer is demodulated and filtered to provide a direct current voltage across resistance 25 at the output of the apparatus. The magnitude of the voltage may be adjusted as described in more detail below, and it is directly proportional to the input voltage from the cell.

Referring to the circuit diagram of FIG. 2, the input signal from the cell electrodes 4 and 5 (indicated at 10) is applied between the common emitters of transistors Q1 and Q2 and the junction of the two primary windings 14 of transformer 15. It is necessary for the negative input to be at the junction of the emitters of Q1 and Q2. The transistors Q1 and Q2, whose bases are alternately biased by the reference signal as will be described below, alternately conduct for approximately 8 milliseconds synchronized to a 110 volt, 60 cycle line.

The resistance R3 is connected across the collectors of the transistors Q1 and Q2 and performs the valuable function of providing a substantially resistive load for the transistors. This improves linearity and tends to reduce noise spikes.

The transformer 15 functions as an ordinary transformer in that it sees a square wave alternating current signal on its primary and transforms this according to the turns ratio to the secondary whose output is a wave from exactly like the primary wave form except that it is stepped down by the turns ratio of approximately 16:1.

The transformer 15 provides the critical isolation between input and output. Its secondary is connected to the emitters of transistors Q3 and Q4 which are a pair of switching transistors that function identically to Q1 and Q2 in that they are synchronized with the 60 cycle line.

The reference or excitation signal source 12, which switches the transistors of the modulator and demodulator, includes a transformer 35 having a primary 36 connected to a 110 volt alternating current source 37. The transformer has a secondary 38 connected to the primary 39 of a transformer 40. Transformer 40 has two secondary windings 41 and 42, 41 being connected to the modulator 11 and 42 being connected to the demodulator 17. Thus, while the reference signal is *inductively* connected to the modulator and demodulator, *conductive* isolation is maintained.

Each secondary winding 41, 42 has an output peak voltage of 156 volts. At the modulator, that voltage is applied across two series connected Zener diodes DZ1 and DZ2 and across two resistors R1, R2. The Zener diodes clip the voltage so that the voltage is an alternating square wave voltage of approximately 8 volts peak to peak. This voltage is applied to the bases of transistors Q1 and Q2. When the reference voltage at terminal A goes positive, current flows into the base of Q1 (Q2 being biased to cutoff), out the emitter, into the junction of R1, R2, through R2 and back to terminal B. Upon reversal of the polarity at terminals A and B, transistor Q1 is cut off and transistor Q2 conducts in a similar manner.

The demodulator 17 includes an identical network of two Zener diodes DZ3 and DZ4 and two resistors R4 and R5 connected to the secondary winding 42. The demodulator 17 operates identically to the modulator 11, the operation of the two modulators being precisely synchronized by the excitation from the common primary 39 of transformer 40. At the output of the demodulator, indicated at lines 48 and 49, the wave form 19 is produced.

When the center tap of the secondary 16 of the transformer 15 goes positive with respect to the emitter of Q4, a current flow is permitted through Q4 along the following path: Current flows out of the secondary of the transformer to the filter 23, back into the junction of the collectors of Q3 and Q4, through transistor Q4, out the emitter of Q4, and back into the secondary 16 of the transformer. When the polarity across the secondary of the transformer switches so that the terminal 48 becomes positive in respect to the emitter of transistor Q3, transistor Q4 no longer conducts but Q3 is switched on synchronized to the 110 volt, 60 cycle line and the current flow to the filter 23 is in a similar manner.

There is a very brief instant of dead time between conduction of the respective transistors as illustrated by the curve 19. This is due to the sine wave input by which the transistors are biased to conduction. The bias is applied to the bases of the transistors as hard as possible to keep them conducting as long as possible in order to shorten the periods between conduction of the respective transistors. There is, however, a brief period between switching when the bias is insufficient for any of the transistors to conduct. The output across terminals 48 and 49, shown in the curve of 19, therefore has switching dead time indicated at 50.

The filter network is designed to attenuate high frequency noise and to smooth out the wave form, that is, by filling in the dead time or spaces between adjacent direct current pulses. It includes the shunt capacitors C2 and C3 and the series resistors R10 and R11. It is important to smooth the output wave form where the output is to be fed into a computer. The computer operators on a sampling basis and the computer might from time to time sample at the dead time and operate the system on the basis of a no voltage reading which would obviously lead to an improper operation.

A resistor R9 is inserted in series with the output to provide a zero voltage adjustment. The zero voltage adjustment is to permit a variation of the zero voltage at the output so that the output voltage over its operating range is most linear.

The voltage applied across the resistor R9 may be taken from any part of the system. That is to say, the only requirement is that it be an isolated voltage source, that is, isolated from the cell electrodes. As a matter of convenience, the voltage is derived from transformer 35 which is fed across a half wave rectifier D1 in series with a filter capacitor C1. The magnitude of the adjustment voltage may be varied by changing the value of variable resistor R6.

Across the resistor R11 is an adjustable resistor R14 and a thermistor 55 which provide the temperature compensation. The resistance of the thermistor goes down with an increase in temperature and by properly calibrating it, through variation in resistor R14, its drop in resistance can compensate for increases in resistance over the whole system due to increasing operating temperatures which tend to cause voltage to drop. The compensating effect of the thermistor is to maintain the voltage up at its proper level regardless of the ambient and instrument temperature condition.

The resistors R12 and R13 provide a voltage divider at the output terminals of the apparatus. The resistances are adjustable so that the customer can have any ratio greater than 20:1 across the output. The particular ratio 20:1 is not critical. Any ratio of input to output could be programmed in the system by selection of components, particularly including the isolating transformer.

We claim:
1. Apparatus for transmitting while conductively isolating a direct current voltage from the electrodes of an aluminum reduction cell comprising,
   a modulator having an input connected to the cell electrodes,
   an isolating transformer having a primary winding connected to the output of said modulator, and having a secondary winding,
   a demodulator connected to said secondary winding, said demodulator having an output,
   a reference source of alternating current voltage including a transformer having a primary and two secondary windings, the secondary windings being conductively isolated from each other and from said primary, said secondary windings being connected respectively to said modulator and demodulator to provide synchronized reference signals for modulating the input to the modulator and demodulating the input to the demodulator,
   said modulator and demodulator each comprising a pair of transistors having bases connected to respective sides of their reference signal secondary winding and having emitter and collector elements,
   one pair of similar elements being tied together and the remaining pair being connected across the respective winding of the isolating transformer, and
   voltage limiting means connected across the bases of said transistors to clip the incoming alternating current signal, thereby providing a square wave input to the transistor bases.
2. Apparatus according to claim 1 in which said voltage limiting means comprises,
   a pair of Zener diodes connected across said bases,
   a pair of resistors connected across said bases, the junction of said resistors being connected to the junction of said tied elements.

References Cited

UNITED STATES PATENTS

| | | | |
|---|---|---|---|
| 3,129,375 | 4/1964 | Huntzinger | 321—16 |
| 3,156,859 | 11/1964 | Cox | 330—10 |
| 3,317,413 | 5/1967 | Chambran | 204—243 |

JOHN F. COUCH, *Primary Examiner.*

W. H. BEHA, JR., *Assistant Examiner.*

U.S. Cl. X.R.

330—10; 324—118; 204—243